United States Patent [19]

Axelrod et al.

[11] 4,448,503

[45] May 15, 1984

[54] AUTOMATIC HIGH SPEED MICROFILM SEARCHING SYSTEM

[75] Inventors: Norman N. Axelrod, New York, N.Y.; Peter Haas, Ridgewood, N.J.; Rainer Noess, Goshen, Mass.

[73] Assignee: Information Retrieval Systems Corp., New York, N.Y.

[21] Appl. No.: 256,140

[22] Filed: Apr. 21, 1981

[51] Int. Cl.³ ............................................. G03B 23/12
[52] U.S. Cl. ................................................. 353/26 A
[58] Field of Search ...................... 353/26 A, 26 R, 25; 235/462, 470, 437; 250/271; 355/41

[56] References Cited

U.S. PATENT DOCUMENTS

| | | | |
|---|---|---|---|
| 3,148,585 | 9/1964 | Armstrong et al. | 353/26 A X |
| 3,322,935 | 5/1967 | Wyke et al. | 250/555 X |
| 3,445,635 | 5/1969 | Trickett et al. | 235/462 X |
| 3,496,340 | 2/1970 | Ryer | 250/555 X |
| 3,564,209 | 2/1971 | Loughnane | 353/26 A X |
| 3,793,507 | 2/1974 | Blizard et al. | 353/26 A |
| 4,110,020 | 8/1978 | Johnson et al. | 353/26 A |

*Primary Examiner*—Harry N. Haroian
*Attorney, Agent, or Firm*—S. C. Yuter

[57] ABSTRACT

An automatic high speed microfilm searching system is disclosed for locating a desired frame of microfilm. Each frame consists of information data and index data. The index data comprises a sequence of vertically-aligned data bar groups, each representing a half character of a sequence of characters of a unique index code for the associated frame. A pair of synchronization bars, each half the width of a data bar, is vertically aligned with each data bar group. Additional synchronization pulses both precede and follow the data bar groups. Depending on which direction the microfilm is moving, the leading synchronization bars are sensed by a bar sensing unit on the left or on the right of the viewing screen. Each sensing bar unit comprises a plurality of vertically-aligned data bar sensors and synchronization bar sensors, with three sensors assigned to each vertical bar in a data bar group, and three sensors assigned to reading the synchronization bars. If the data bars are centrally located each of the three synchronization bar sensors senses the leading synchronization bar; if the data bars are high, only one or two of the central and high synchronization bar sensors senses the leading synchronization bar; if the data bars are low, only one or two of the central and low synchronization bar sensors senses the leading synchronization bar. A bar position determining means is responsive to the three synchronization bar sensors to determine whether the data bars are high, centrally positioned or low. The transition between synchronization bar pairs is used to latch the correctly-read character data into storage. After two half characters are stored they are transferred to a computer for comparison with the desired frame index code. When the available frame index code corresponds with the desired frame index code, the microfilm is stopped to project the desired frame onto the viewing screen.

11 Claims, 9 Drawing Figures

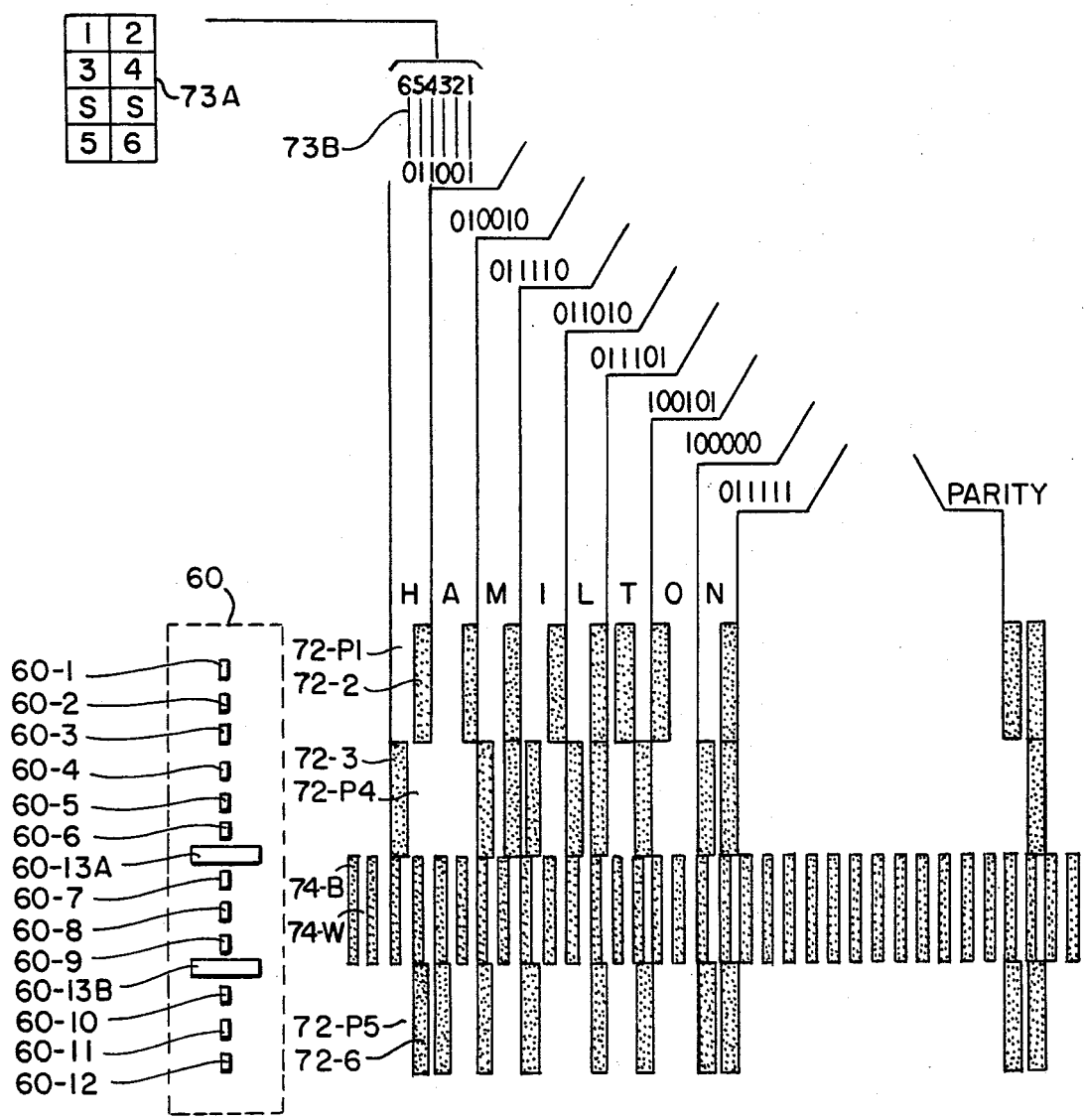

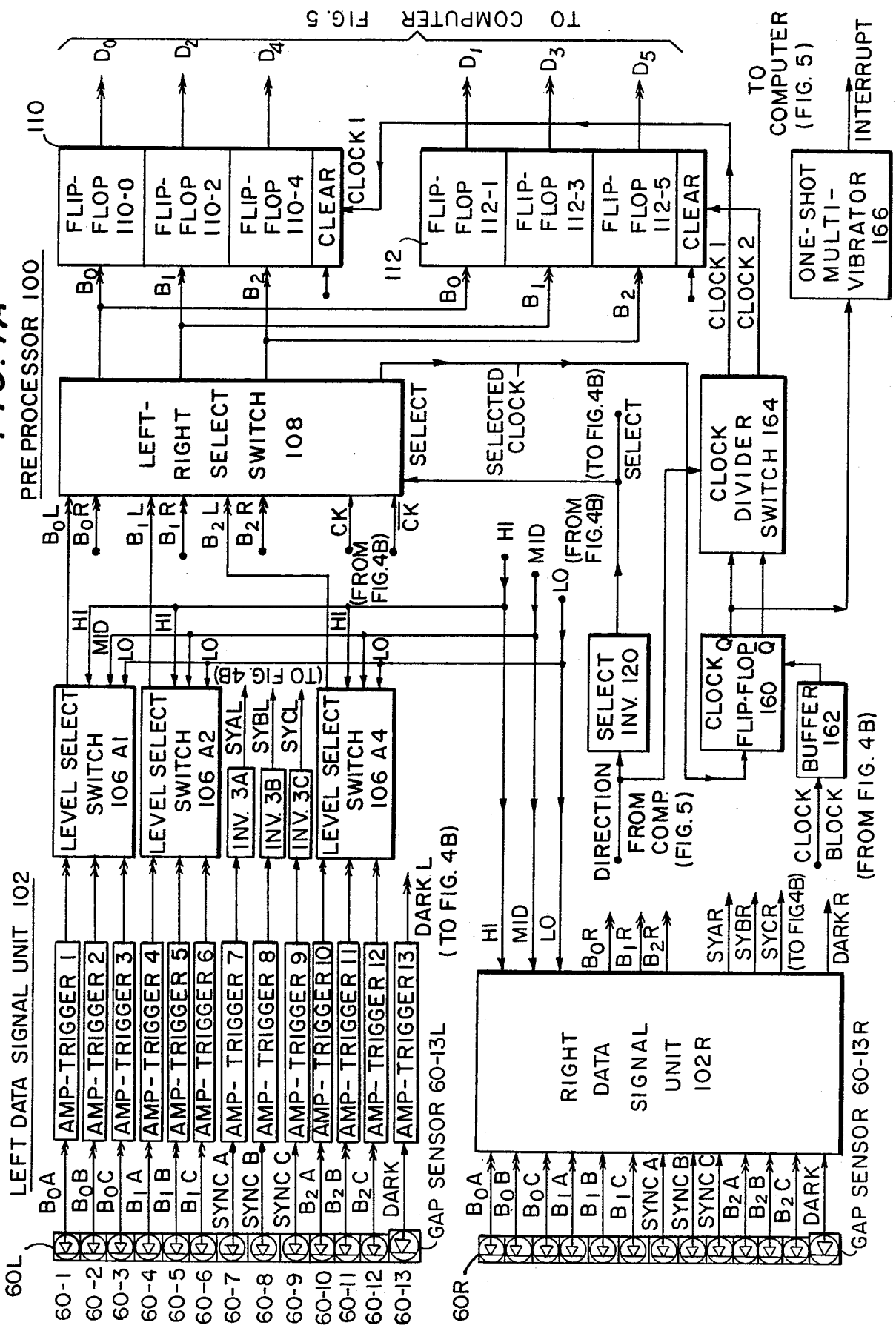

AUTOMATIC HIGH SPEED MICROFILM SEARCHING SYSTEM

This invention relates to the high speed retrieval of information on microfilm and more particularly to an automatic system for locating specific indexed frames of microfilm.

The use of microfilm is widespread and conventional for purposes of preserving large quantities of information, whether generated by photographing documents or computer generated as digital data to be recorded on the film directly. The conventional method of reading microfilm is to employ a reading apparatus in the form of an optical projector, operated manually or electrically, wherein the film is advanced past a projection mechanism for viewing on a screen. Since reels of microfilm may contain many thousands of frames, the amount of time necessary to retrieve any individual frame becomes inconveniently large when accomplished by direct reading.

In direct view retrieval, the images are advanced past the viewing apparatus at a rate faster than the eye can absorb, thus showing only a blur of light. When the approximate area of retrieval is reached, the film must be slowed to a speed enabling the operator to view a reference to determine if the required frame has been reached. Since the process is inexact, starting, slowing and stopping of the film must be repeated several times to provide the proper frame position.

A major advance in information retrieval is the high speed microfilm searching system disclosed in U.S. Pat. No. 3,895,865 issued July 22, 1975. A commercial embodiment has been marketed under the trademark Strobe Search 100. The system optically displays frames of the microfilm. A frame is made up of a sensor mark, a page of information and an index code. The index code is a meaningful alphanumeric or numeric key that accompanies each page of data. If it is alphabetic it varies in strict alphabetic sequence. If the components of the key are numeric they vary in increasing or decreasing order.

The Strobe Search 100 system employs microfilm projecting means mounted in the film path between feed and take-up reels. The projecting means clearly displays on a viewing screen a page of information when the microfilm is stationary. But when the microfilm is moving a strobe lamp displays indexes of the film on the screen. Each of the frames with an index code also has a sensor marker which is optically detectable. Electronic control means is optically responsive to each marker to generate a marker signal which can trigger the strobe and display the index of that page, like a movie picture, when the microfilm is moving rapidly. At very low microfilm retrieval speeds each character of the index is legible so that all of the characters of the index can be read by the user. At higher speeds only more significant characters can be read because of the rapid change of the low order characters. At increasingly higher retrieval speeds the electronic control means is only responsive to every second, third, fourth, etc. marker signal, depending on how fast the microfilm is moving.

As the desired index comes into range, whether going forward or backward, the operator slows the speed of the microfilm so that more of the characters of the index can be read. When the desired index is very close, the film is moved very slowly so that all of the characters of each index can be read. The film is then stopped on the desired frame so that the contents of the frame can be read on the viewing screen.

The Strobe Search 100 microfilm reader, which incorporates the invention of U.S. Pat. No. 3,895,865, has achieved impressive commercial success. Even so, a need has developed for an even faster and more efficient microfilm searching system.

A general object of this invention, therefore, is to satisfy the need for an even faster and more efficient microfilm searching system.

A specific object of the invention is to provide such a system by employing machine readable indicia on the microfilm in the form of optically detectable index data bars.

The storage of data on rapidly moving recording mediums is old. For example, data has been magnetically stored on magnetic tape and rotating magnetic discs and drums. To locate a specific portion of data, for example a register on a rotating disc, index numbers corresponding uniquely to each register are generated magnetically employing a magnetic reading head to read the permanently stored indexes, or addresses, on the disc in the form of binary ones and zeros. An optical analogy would be to optically record on the microfilm index data in the form of data bars representing binary ones and zeros and employ one photo diode per data bar to scan the index data at the microfilm. But the analogy fails because computer-generated microfilm data is not always recorded in exactly the same positions on the microfilm so that index data bars cannot reliably be read that way. Of course, the index data bars can be made so large and the sensing diodes spaced correspondingly far apart so that the index data can reliably be read. But such large data bars are incompatible with using the Strobe Search 100's index code display system, which requires a relatively large sensor marker to strobe relatively large index code characters onto the viewing screen.

So, another general object of the invention is to solve this problem.

This problem was solved by reading the index bits after they are projected and thus magnified by the optical projection system of the microfilm reader.

But then another problem arose, even more difficult than the first. That is, small movements in the microfilm as it passed through the projection system were greatly magnified by projection so that at the viewing screen the vertical movements of the index data over a plurality of frames were such that reading the index data with available photo diodes was unreliable. The projected optical index bits would move away from the photo diode assigned to a specific binary bit position.

Thus, the principal object of the invention is to solve the problem of reading optically projected index data which shifts in vertical position with movement of the microfilm.

The solution to that problem, in accordance with a specific aspect of the invention, is to "float" the photo diodes so that specific optical index binary digits are reliably read even though the index bits moved up and down with respect to the viewing screen.

Briefly, in accordance with the preferred embodiment of the invention, an automatic high speed microfilm sensing system is provided comprising a microfilm reader which projects on a viewing screen pages of information data recorded on microfilm frames. Index data consisting of a plurality of alphanumeric characters of the index code for each frame are recorded in an area below the information data. The index data consists of binary-coded vertically-aligned data bars, with three vertical data bar positions representing a half of a character of the index code.

An index data sensing unit is fixedly mounted adjacent to each side of the viewing screen and within the field of focus of the projected data bars. Each index bar sensing unit has three photo diodes assigned to read each of the three vertical data bar positions of a half character, for a total of nine diodes. Also included in the index data recorded on the microfilm are synchronization bars positioned in vertical alignment with the three data bars, with each sync bar half the width of a data bar and alternating black and white. The sync bars, positioned between two upper data bars and one lower data bar, continuously repeat within a frame and, moreover, both lead and follow the data bars representing the index code for the frame. The index data sensing unit also has three photo diodes for sensing the sync bars. The three sync bar diodes are vertically aligned with the nine data bar diodes and between the upper six and the lower three diodes.

Thus, whether the microfilm is moving in a forward or reverse direction, three photo diodes of each of the two index data sensing units (one unit on the left and one on the right of the viewing screen) are vertically positioned so that even with maximum vertical movement of the projected index data image, at least one of the three sync bar sensing diodes will sense the leading sync bars of a frame.

The system then logically determines whether the upper, middle or lower sync bar sensing diodes sensed the leading sync bars. That sync bar determination is then used to select the data bar signal from one of the three diodes, assigned to each data bar position, which corresponds in vertical position with the sync bar sensing diodes which sensed the sync bars. For example, if the higher of the three sync bar sensing diodes senses the sync bars, then, for each of the three data bar sensing diodes assigned to each of the three data bars of a half character, the higher of the three diodes is selected as the data bar sensing diode which correctly read the associated data bar for that specific vertical position of the projected data bar images.

The invention is more generally defined by the claims, which follow the detailed specification of the invention.

The foregoing objects and brief description of the invention will become more apparent from the following detailed specification and appended drawings, wherein:

FIG. 3A is a negative of index data bars and sync bars as projected onto the viewing screen in relationship to a diode sensing unit together with exemplary binary coding;

FIGS. 4A and 4B are a block diagram of the preprocessor portion of the invention showing how index data bar and sync bar images are converted to index code data, whether the microfilm is moving from right to left or from left to right.

GENERAL DESCRIPTION OF SYSTEM (FIGS. 1 AND 5)

Figure 1:
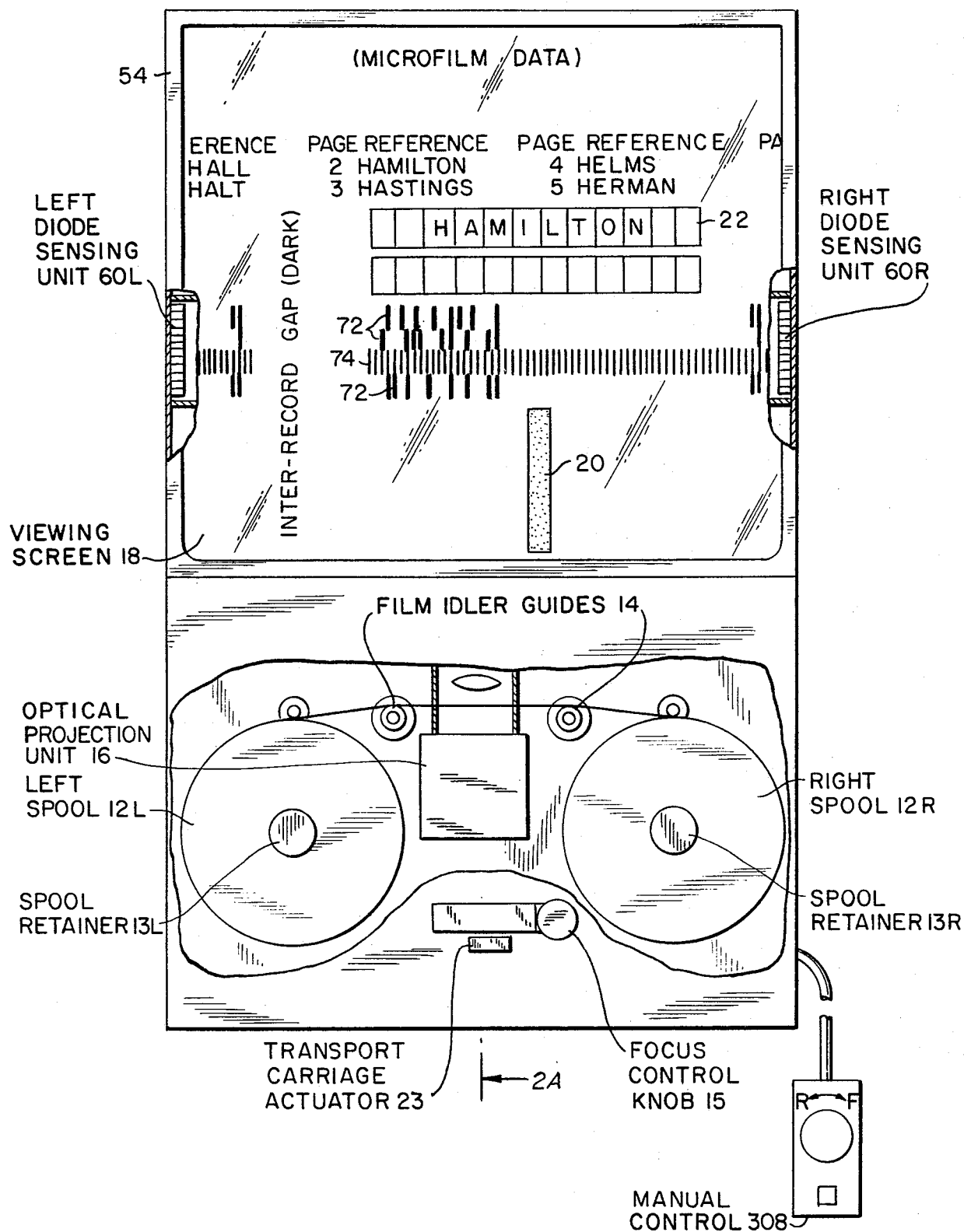
FIG. 1 is a diagrammatic front elevational view of a microfilm reader showing the relationship of the film, the optical projection apparatus and the viewing screen with diode sensing units on the right and left shown in a broken away view, and the index code data shown projected on the viewing screen.

Referring to FIG. 1, a microfilm reader 10 is disclosed generally comprising left and right spools 12L and 12R containing 105 millimeter microfilm which passes between spools 12 via film idler guides 14 and past optical projection unit 16 which projects the images on the microfilm onto viewing screen 18. The spools 12L and 12R are retained in place by spool retainers 13L and 13R respectively. An exemplary representation of index code data and a portion of information data is displayed on the viewing screen 18 together with an optical strobe marker 20. Focus control knob 15 permits the image to be focused sharply on the viewing screen 18.

The optical strobe marker 20, in accordance with the invention claimed in the Strobe Search 100 U.S. Pat. No. 3,895,865, triggers a strobe to display the index code 22 ("HAMILTON") for the viewed frame of microfilm. That apparatus is not disclosed in this specification since it is not part of the claimed invention.

The index code data comprises data bars 72 and synchronization bars 74 imaged on the viewing screen 18. Immediately adjacent to the left and right sides of the viewing screen 18 and positioned to scan the data and sync bars, is a left diode sensing unit 60L and a right diode sensing unit 60R respectively. One or the other diode sensing unit 60 is activated, depending on which direction the microfilm image is moving—from left to right or from right to left. The general purpose of each diode sensing unit 60 is to sense the data and sync bars as the frame image begins its passage across the viewing screen 18.

The goal of the system is to automatically locate a desired frame of the microfilm for viewing on the viewing screen 18. This is generally accomplished with the reading of the data and sync bars by the left or right diode sensing unit 60. Since the projected image is subject to vertical movement as it moves from frame to frame, and the sensing diodes are fixed, three sensing diodes are provided to sense each of three vertically-aligned data bars and the associated sync bars.

The diode sensing units 60 feed a preprocessor 100 (FIG. 5), which, in accordance with the invention, selects the three binary bits of each half character of the index code, assembles two three bit groups into a character, and transmits the character to the computer 300. The computer 300 is fed by a keyboard 302 on which the index code of a desired frame of microfilm can be entered into the computer 300, together with a display 304 for displaying the entered desired index code. The computer also feeds a film control and drive 306 which controls the microfilm reader 10. The speed and direction of movement of the microfilm can also be controlled by the manual control 308 which feeds the film control and drive 306.

The computer 300 compares the available index code with the desired code and stops the microfilm at the desired frame after it has been located.

After the desired frame is located and projected onto the viewing screen 18 (FIG. 1), transport carriage actuator 23 provides for transverse movement of the optical projection unit 16 so that any portion of the frame can be viewed.

The main problem is that as the microfilm is moved, its image shifts vertically on the viewing screen 18. However, the diode sensing unit 60 together with the preprocessor 100 solves this problem, as will now be described in greater detail.

OPTICAL PROJECTION SYSTEM (FIGS. 2A AND 2B)

Figure 2A:
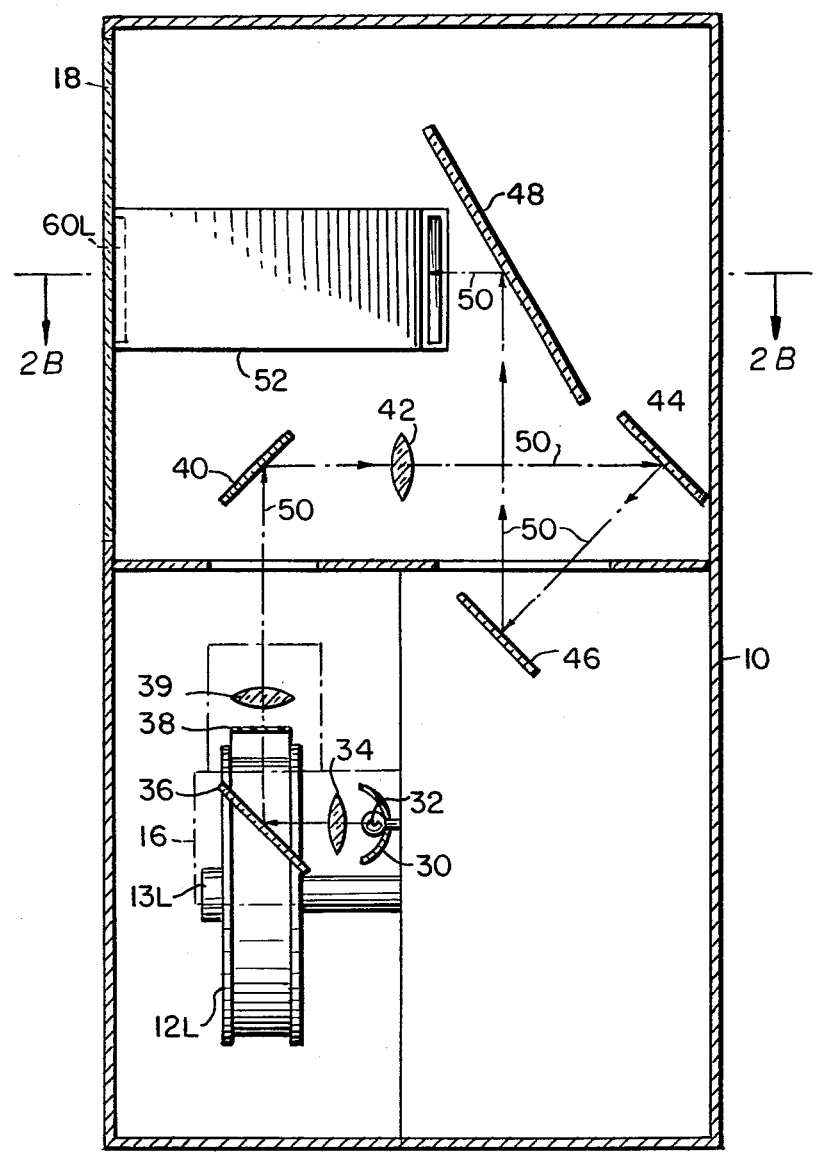
FIG. 2A is a diagrammatic side elevational view taken along the lines 2A—2A of FIG. 1 of the microfilm reader showing the optical path of the images projected from the film together with the relationship to the diode sensing unit on one side of the viewing screen of the microfilm reader.

Referring to FIG. 2A, the optical projection system of the microfilm reader 10 is shown in diagrammatic form. The optical system includes, in the following sequence,: lamp reflector 30, projection lamp 32, lens unit 34, mirror 36, film 38, lens unit 39, mirror 40, lens unit 42, mirror 44, mirror 46 and mirror 48. The center line of the optical path is designated 50.

The diode sensing unit 60L is mounted in the viewing screen flange 54 (FIG. 1) with the sensing plane of its diodes facing rearward parallel to the plane of the viewing screen 18 and within the depth of focus of the images projected onto the viewing screen 18. Thus, FIG. 1 shows the back of the left diode sensing unit 60L. The right diode sensing unit 60R is similarly positioned adjacent to the right side of the viewing screen 18.

Figure 2B:
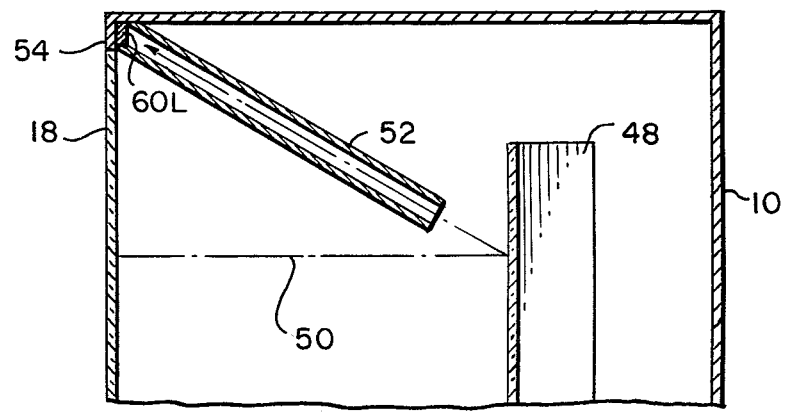
FIG. 2B is a diagrammatic plan view, taken along the lines 2B—2B of FIG. 2A showing how projected index code data passes through a tunnel to a diode sensing unit.

The diode sensing unit 60L (FIG. 2B) is protected from extraneous light by the tunnel 52, which is constructed of black material in the form illustrated. The angular position of the tunnel 52 is shown in FIG. 2B.

DIODE SENSING UNIT 60 (FIGS. 3A AND 3B)

Figure 3B:
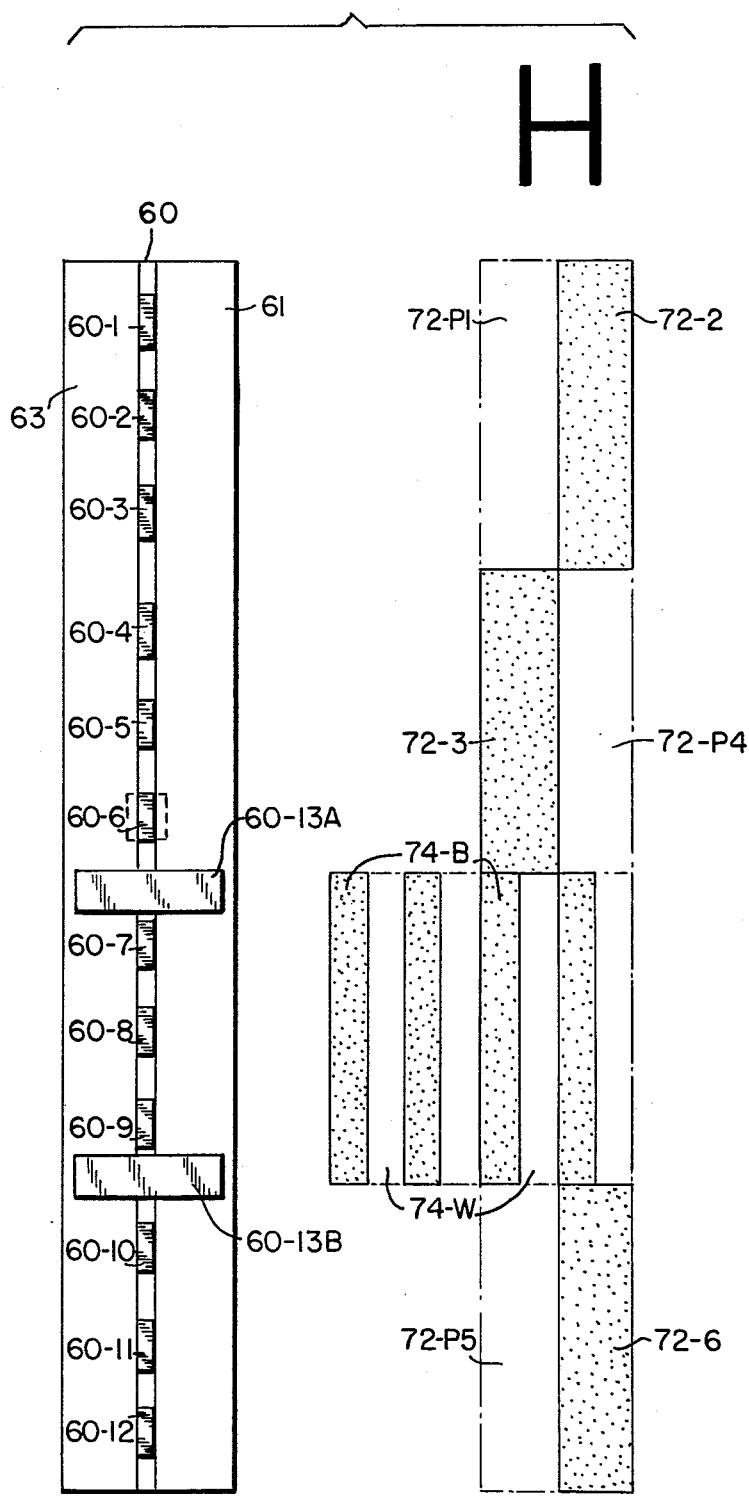
FIG. 3B is a diagram of the index data bars and sync bars for one six binary digit character and the relationship with a diode sensing unit, at approximately twice the scale of the present embodiment of the invention.

The arrangement of each of the diode sensing units 60, whether the diode sensing unit 60L on the left side of the viewing screen 18 of the microfilm reader 10, or the diode sensing unit 60R on the right side, is the same and is disclosed in FIGS. 3A and 3B.

The diode sensing unit 60 (FIG. 3A) comprises a plurality of vertically-aligned photo diodes 60-1 to 60-12, with each diode 60 positioned so that it scans either a data bar 72 or a synchronization bar 74.

Data bar diodes 60-1 to 60-3 scan the high upper data bar positions 72-p1 and 72-2.

72-p1 indicates the absence of a data bar in the high upper position of the three odd binary digits of the six bit character, and 72-2 indicates the presence of a data bar in the adjacent group of three binary even characters, the six bits representing the first alphanumeric character ("H") of the index code ("HAMILTON") for the illustrated frame.

The character data format is shown at 73A and 73B. It should be noted that in FIGS. 2 and 3, data bars 72 and sync bars 74 shown in black are really the negative of a corresponding white display on the viewing screen 18 of the microfilm reader 10. Thus the white space between black bars is really dark, as is the space or inter-record gap between frames on the microfilm.

Similarly, data bar diodes 60-4 to 60-6 scan the low upper data bars 72-3 and data bar position 72-p4; and diodes 60-10 to 60-12 scan the lower data bar position 72-p5 and data bar 72-6. Thus, three diodes are provided to scan each of the three vertically-aligned data bar positions, and one or more of the three will sense a data bar depending on whether the data is vertically high, or low, or centrally positioned, with respect to the diode sensing unit 60.

Sync bar diodes 60-7 to 60-9 scan the sync bars 74. The sync bars 74 alternate between black and white, with two sync bars 74 for each data bar 72. The sync bars 74 also extend to the right and left of the data bars 72 so that the sync bars lead the data bars whether the film is moving from left to right or right to left.

The leading sync bar 74 is used to excite one, two or three of the sync bar diodes 60-7 to 60-9. Which of the three diodes 60-7 to 60-9 are excited by the images of the sync bars tells whether the index data area is high, low or centrally positioned on the viewing screen 18. That information is required to select the correct data bar diodes to read the index bar data.

Diodes 60-13A and 60-13B are used to sense the inter-record gap between frames (normally dark but shown light). FIG. 3B illustrates the relationship between the gap diodes 60-13 and the sync bars 74. The drawing is about twice the scale of the present embodiment of the invention.

Gap diodes 60-13 sense the inter-record darkness (shown light) by sensing for the presence of sync bars 74. Sync bars 74 are only deemed present during the projection of a frame of data onto the diode sensing unit 60. The upper gap diode 60-13A scans the upper portions of the sync bars 74, and the lower gap diode 60-13B scans the lower portions of the sync bars 74. Moreover, the gap diodes 60-13 are wide enough to bridge at least two sequential black sync bars 74 so that when the sync bars are centrally positioned both gap diodes 60-13 sense the sync bars and thus know that there is no inter-record gap present. If the projected image is high on the viewing screen, then the sync bars 74 are correspondingly high so that only gap diode 60-13A will sense sync bars. When the projected image is low, then the sync bars 74 are correspondingly low so that only gap diode 60-13B scans the sync bars. Thus, whatever the vertical position of the sync bars, one of the two gap diodes 60-13 will sense the presence of at least two black sync bars and provide information to know that a frame is present at the diode sensing unit 60 and that the inter-record gap has not occurred.

One use of the inter-record gap (normally dark) is to signal to the system that the next data after the gap is the beginning of an index code. The sensing of the gap is also used to reset the system for reading the next sequence of characters of the index code for the coming frame of microfilm. More about that later.

In the present embodiment of the invention, the screen height of each data bar 72 and each sync bar 74 is about one inch. Each sync bar diode 74 and data bar diode 72 is about 60 mils wide and 150 mils high and is spaced from the adjacent diodes for that bar by about 150 mils. The upper edge of the upper diode of a three diode group is about 125 mils below the top edge of the scanned bar (when centrally located) and the lower edge of the lower diode of a three diode group is about 125 mils higher than the lower edge of the scanned bar (when centrally located).

Between the upper edge of the sync bar diode 60-7 and the lower edge of the data bar diode 60-6 is about 250 mils. The upper gap diode 60-13A is about 150 mils high and 500 mils wide and is positioned in this 250 mil space but nearer to the sync bar diode 60-7. The lower gap diode 60-13B is similarly sized and positioned between the sync bar diode 60-9 and the data bar diode 60-10, but nearer to the sync bar diode 60-9.

Thus, one or the other, or both, of the gap diodes 60-13 is always scanning a black sync bar 74-B except when the diode sensing unit 60 is in the inter-record gap between frames (which is always dark, or black, though shown light, or white).

Figure 3C:
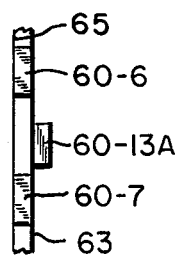
FIG. 3C is a cross-sectional side view of a portion of the diode sensing unit showing how it is constructed.

In the present embodiment of the invention, the diode sensing unit 60 (FIG. 3B) was made by placing each of the diodes 60-1 to 60-12 on two adjacent opaque plastic sheets 61 and 63 adjacent to each other and spaced about 60 mils, and then covering the 12 diodes with insulating adhesive tape 65 (FIG. 3C). Then the unit was turned over and the gap diodes 60-13A and 60-13B were adhered to the plastic sheets 61 and 63 using front and back adhesive tape.

The 60 mil gap between the two opaque plastic sheets 61 and 63 thus limits the sensing area of each of the 12 data bar and sync bar diodes to 60 mils width by 150 mils height. Since each sync bar 74 is about 125 mils in width, each diode can only read one sync bar at a time. The data bars 72 are about 250 mils in width so the data bar diodes can easily read only one data bar at a time.

The diode sensing unit 60 as shown in FIG. 3 is mounted on a mounting plate which is positioned immediately adjacent to and in substantially the same plane as the viewing screen 18 (FIG. 2B), except for projecting slightly forward toward the mirror 48. However, the surface plane of each photo diode is well within the depth of focus of the projected index bar and sync bar data.

PREPROCESSOR 100 (FIGS. 4A AND 4B)

Figure 4B:
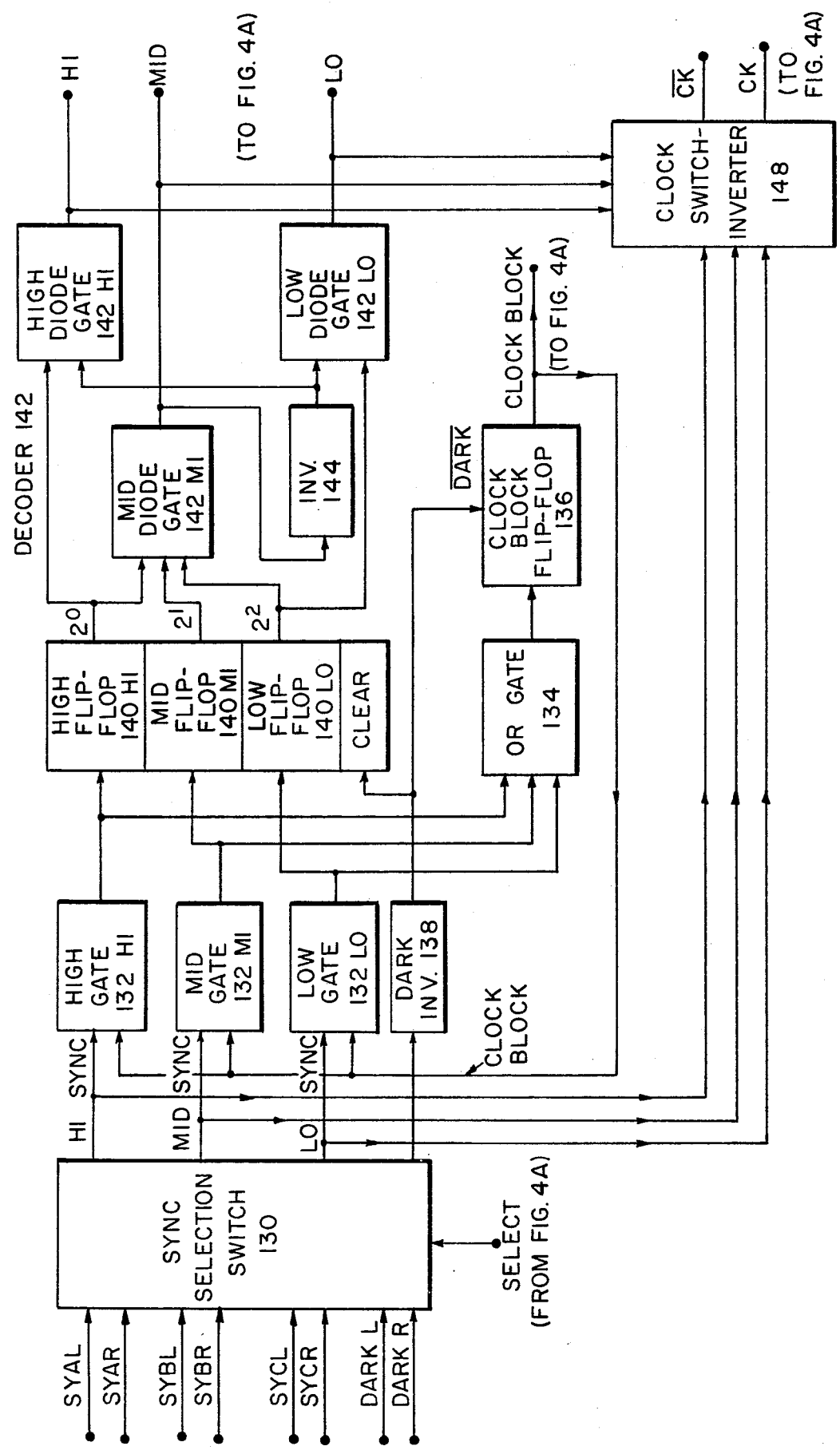

The preprocessor 100 is shown in detail in FIGS. 4A and 4B. Its purpose is to determine whether the data bars 74 are high, low or centrally located, and then to select the output of the upper, lower or middle data bar diode 60 as the diode which is correctly reading the associated data bar. The preprocessor 100 accomplishes this task, in accordance with the invention, by examining the signal output of each of the three sync bar diodes 60-7 to 60-9 (FIG. 3B). If the data is centrally located then each of the three sync bar diodes will produce a signal. If the data is high, then only sync bar diodes 60-7 and 60-8 will generate signals. If the data is very high, then only sync bar diode 60-7 will generate a signal. Similarly, if the data is low, only sync bar diodes 60-8 and 60-9 will generate signals; and if the data is very low, then only sync bar diode 60-9 will generate a signal. The signal output of the three sync bar diodes is used to determine which data bar diode of each of the three data bar diodes (for each data bar 72) will be selected to read the data bar 72.

The present embodiment of the invention is designed for a maximum vertical movement of about one inch in the index data projected onto the diode sensing unit 60. For a larger amount of maximum vertical movement, say one and a half inches, then five sync bar diodes may be used, instead of three, to sense one of the three sync bars per half character; and five data bar diodes may be used for sensing each of the three vertically-aligned data bars 72 per half character.

The invention will be described in detail in connection with the present embodiment which only allows for a maximum vertical movement of one inch. In the drawing, data lines have double arrow heads and control lines single arrow heads.

Figure 5:
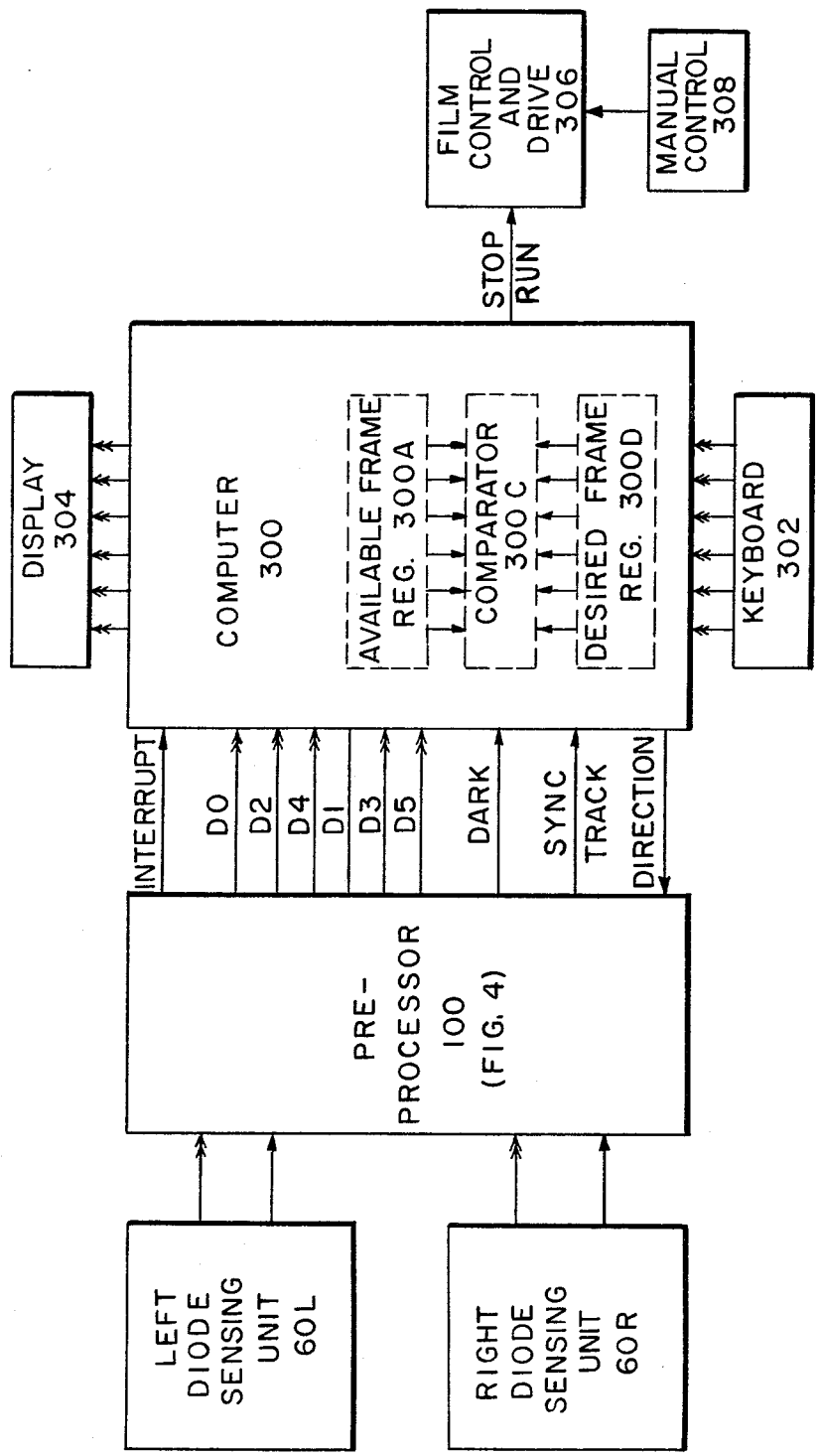
FIG. 5 is a block diagram of the entire system, excluding the microfilm reader, showing how a desired frame of microfilm is located.

Referring to FIG. 4A, the preprocessor 100 generally comprises the left and right data signal units 102L and 102R which feed a left-right select switch 108 which selects the left or right data signal unit depending on whether the microfilm is moving from left to right or from right to left. The switch 108 feeds data storage unit 110 with the correctly selected data representing the three odd binary bits of a six bit character of the index code. The three even bits are fed into storage unit 112. The six bits of the character are then available for transfer to the computer 300 (FIG. 5).

The left data signal unit 102L (FIG. 4A) consists of the diode sensing unit 60L whose data bar diodes feed amplifier-triggers 1-6 and 10-12, and whose sync bar diodes feed amplifier-triggers 7-9. The two gap sensor diodes 60-13 of the diode sensing unit 60L are paralleled and jointly feed amplifier trigger 13.

Each amplifier-trigger consists of three operational amplifiers in series, with the last amplifier feeding a Schmidt trigger. Thus, when a photo diode senses a data or sync bar the output of the Schmidt trigger reflects that signal as a binary voltage level.

In the case of the sync bar diodes, the transitions from white to black are sensed to provide the basis for the generation of clock signals, as will be described later.

The gap sensor diodes 60-13, which sense the inter-record gap, feed amplifier trigger 13 to generate a DARK signal.

The signals feeding the amplifier-triggers 1 to 13 are identified on FIG. 4A. $B_0A$ represents the sensing of a high upper data bar 72-1 or 72-2 sensed by the high data bar diode 60-1 (also see FIG. 3B); $B_0B$ represents the sensing of a data bar 72-1 or 72-2 by the middle diode 60-2, and $B_0C$ represents the sensing of a data bar 72-1 or 72-2 by the low diode 60-3.

Similarly, signals $B_1A$, $B_1B$ and $B_1C$ represent data bars 72-3 or 72-4 sensed by the high diode 60-4, the middle diode 60-5 or the low diode 60-6 respectively.

Similarly, signals $B_2A$, $B_2B$ and $B_2C$ represent data bars 72-5 or 72-6 sensed by the high diode 60-10, the middle diode 60-11 or the low diode 60-12 respectively.

Thus, if the three vertically-aligned data bars 72 are centrally located, they are sensed by the middle diodes 60-2, 60-5 and 60-11 respectively. If the data bars 72 are high they are sensed by the high diodes 60-1, 60-4 and 60-10 respectively. If the data bars 72 are low they are sensed by the low diodes 60-3, 60-6 and 60-12 respectively. Whether the output signals from the high middle or low data bar diodes are selected for processing is determined by which sync bar diodes—60-7, 60-8 or 60-9—sense the sync bar 74 in vertical alignment with the three data bars 72.

The output signals of the high, middle and low sync bar diodes 60-7, 60-8 and 60-9 are SyncA, SyncB and SyncC, respectively, and are fed to the amplifier triggers 7, 8 and 9, respectively. Inverters 3A, 3B and 3C invert the outputs of amplifier triggers 7, 8 and 9, respectively, to produce the signals SYAL, SYBL and SYCL; the "L" signifies that these three signals are from the *left* data signal unit 102L. Corresponding signals SYAR, SYBR and SYCR are produced by the right data signal unit 102R. Which signals are used is determined by which direction the microfilm is moving, from left to right or from right to left.

The computer 300 (FIG. 5) controls the entire system and knows which direction the film is moving since the computer 300 controls the film control and drive 306 which moves the microfilm one direction or the other. Computer 300 produces a Direction signal, whose high or low level indicates the direction, which is fed to the preprocessor 100, and more particularly, to select inverter 120 (FIG. 4A). Select inverter 120 generates the Select signal which is used to control the selection of signals from the left data signal unit 102L or the right data signal unit 102R.

The right data signal unit 102R is the same as the left data signal unit 102L except that it receives data and sync bar signals from the right diode sensing unit 60R (FIG. 1) rather than the left diode sensing unit 60L.

Signals SYAL, SYBL and SYCL (FIG. 4B), originating from sync bar diodes 60-7, 60-8 and 60-9 (also see FIG. 4A) of the left diode sensing unit 60L together with the corresponding signals SYAR, SYBR and SYCR originating from the right diode sensing unit 60R, are fed to sync selection switch 130. Also fed to switch 130 are the DARKL and DARKR signals originating from the gap sensors 60-13L and 60-13R respectively, which indicate when the diode sensing units 60L and 60R are in the inter-record gap, thus indicating the next data sensed is at the start of a sequence of characters representing the index code for the next frame.

Also fed to sync selection switch 130 is the Select signal, indicating which diode sensing unit 60 should be reading the data and sync bars. Sync selection switch 130 is basically a four-pole double-throw electronic switch. It selects either the signals from the left diode sensing unit 60L or the right diode sensing unit 60R and feeds the sync bar signals, representing Hi sync, Mid sync or Lo sync, to gates 132HI, 132MI and 132LO respectively. The gates 132 are two-input "and" gates, the second input being a Clock Block signal.

The purpose of the Clock Block signal is to block gates 132 after the first light to dark transition of a sync bar occurs in a frame. Gates 132 help determine whether the film is high, low or centrally located vertically; and once that determination is made it remains for the entire frame. So the first light to dark transition of a sync bar (or dark to light transition if the film is moving in the opposite direction) sensed by sync diodes 60-7, 60-8 and/or 60-9 after an inter-record gap produce Hi Sync, Mid Sync and/or Lo Sync outputs from sync selection switch 130, and pass through gates 132Hi, 132Mi and/or 132LO because the Clock Block signal is initially absent and gates 132 are enabled. The three outputs of gates 132 are fed via "or" gate 134 to clock block flip-flop 136, which then sets at the trailing edge of the first light sync bar, producing the Clock Block signal which blocks gates 132. Gates 132 remain blocked until the next inter-record gap produces a DARK complement signal via dark inverter 138, fed by switch 130, which resets the clock block flip-flop 136. Then gates 132 are enabled to pass the waveform correponding to the light of the leading sync pulse preceding the next frame.

The sync signal outputs of gates 132HI, 132MI and 132LO feed the set inputs of high, middle and low flip-flops 140HI, 140MI and 140LO respectively. If the syncc bars 74 (also see FIG. 3B) projected onto the selected diode sensing unit 60 are centrally located, then Hi Sync, Mid Sync and Lo Sync signals pass through gates 132 and set each of the three high, mid and low flip-flops 140, whose three outputs may be considered to represent the binary number 111 or decimal 7, as indicated by binary weights $2^0$, $2^1$ and $2^2$ on FIG. 4B.

If the sync bars are high, the high and mid flip-flops 140 are set and binary 011 or decimal 3 is generated. If only the high flip-flop 140 is set because the sync bars 74 are very high, binary 001 or decimal 1 is generated.

If the sync bars 74 are low, the mid and low flip-flops 140 are set indicating binary 110 or decimal 6. If the sync bars 74 are very low, only the low flip-flop 140 is set generating binary 100 or decimal 4.

The flip-flops 140 are part of a Quad flip-flop (as are the storage units 110 and 112) with a common clear terminal. The flip-flops 140 are reset by the Dark complement signal from dark inverter 138 when the inter-record gap is sensed, preparing the flip-flops 140 to respond to the next appearing light sync pulse.

The outputs of the flip-flops 140 are decoded by the decoder 142. Decoder 142 comprises the high diode gate 142HI, the mid diode gate 142MI and the low diode gate 142LO.

When the sync bars are centrally located, the three flip-flops 140 generate binary 111 and their outputs are fed to mid diode gate 142MI, a three-input "and" gate. Mid diode gate 142MI then generates a mid signal, which is inputed to the data signal units 102 (FIG. 4A) for data diode signal selection.

The high diode gate 142HI is a two-input "and" gate fed by the output of high flip-flop 140HI and the output of mid diode gate 142MI via inverter 144. If the sync bars are high producing binary 011, or very high producing binary 001, from the flip-flops 140, then high diode gate 142HI generates a hi signal for data diode selction.

Low diode gate 142LO is a two-input "and" gate fed by the output of low flip-flop 140LO and the output of mid diode gate 142MI via inverter 144. If the sync bars 74 are low producing a binary 110 from the flip-flops 140, or very low producing a binary 100, then low diode gate 142LO generates a lo signal for data diode selection.

The hi, mid and lo signals produced by the decoder 142 are fed to both the left data signal unit 102L (FIG. 4A) and the right data signal unit 102R. In particular, the hi, mid and lo signals are fed to each of the level select switches 106A1, 106A2 and 106A4. Each level select switch 106 is a single-pole three-throw electronic switch which selcts one of three signals from the three data bar diodes assigned to each of the three data bars 72 (also see FIG. 3B).

Thus, level select switch 106A1 is responsive to signals from the data bar diodes 60-1, 60-2 and 60-3. If the data bars are high or very high, indicated by the hi signal input to switch 106A1, then the switch will select the data bar signal ($B_0A$) from the data bar diode 60-1 and feed that signal to the left-right select switch 108, a four-pole double-throw elctronic switch. If the data bars are centrally located, as indicated by a mid signal fed to switch 106A1, then the data bar signal from data bar diode 60-2 ($B_0B$) is selected and fed to switch 108. If the data bars are low or very low, as indicated by the presence of the lo signal at switch 106A1, then the data bar signal from data bar diode 60-3 ($B_0C$) is selected and fed to switch 108.

If the data bar signal is from the left data signal unit 102L it is designated $B_0L$ and represents the data bar 72-1 or 72-2 sensed by the left diode sensing unit 60L. If the signal is from the right data signal unit 102R it is designated $B_0R$ and represents the data bar 72-1 and 72-2 from the right diode sensing unit 60R.

Left-right select switch 108 chooses the correct $B_0$ signal for storage in the storage unit 110 fed by switch 108, because of the Select signal fed from select inverter 120.

The level select switch 106A2 similarly selects the $B_1A$, $B_1B$ or $B_1C$ signal and feeds the selected signal to left-right select switch 108 as $B_1L$ or $B_1R$.

The level select switch 106A4 similarly selects the $B_2A$, $B_2B$ or $B_2C$ signal and feeds the selected signal to switch 108 as $B_2L$ or $B_2R$.

Also fed to the input of left-right select switch 108 are the CK and CK complement signals from clock switch-inverter 148 (FIG. 4B).

Clock switch-inverter 148 is a single-pole three-throw electronic switch fed by the Hi, Mid and Lo Sync signals from sync selection switch 130 and the hi, mid and lo signals from decoder 142. The hi, mid and lo signals indicate which of the three Sync signals to select for use as the clock signals CK and CK complement (via the internal inverter) to time the storage of the data bar signals.

Referring to FIG. 3B, it will be seen that there are two sync bars, 74-B and 74-W, for each vertically-aligned data bar 72. Thus, the transition between the (negative) black sync bar 74-B and the (negative) white sync bar 74-W (from white to black in positive representation) occurs at the center of the adjacent data bar 72. And that is the precise time that the three data bars representing a half character are sampled for storage. Whether the first sync bar transition is from black to white or from white to black depends on the direction of film. But in either case, either a CK clock pulse or a CK complement clock pulse is produced by the clock switch inverter 148 (FIG. 4B) and fed to left-right select switch 108 (FIG. 4A).

Switch 108 selects one or the other clock pulse and feeds it to clock flip-flop 160, which cycles between the Q and Q complement output as each clock pulse is received from switch 108. Another input to the clock flip-flop 160 is the Clock Block signal from buffer 162, which blocks out noise signals on the flip-flops' input due to skewing of the sync bar.

Both Q outputs of flip-flop 160 are fed to clock divider switch 164, which knows which way the film is moving from its Direction signal input from computer 300 (FIG. 5). Depending on the direction of film, clock divider switch 164 always sends a Clock 1 signal to data storage unit 110 and a Clock 2 signal to data storage unit 112. Data storage unit 110 stores the three even bits of a character and data storage unit 112 stores the three odd bits of a character.

Again returning to FIG. 3B, a six bit character (say representing "H") comprises two sequential three-bit characters. The first bits which occur when the data bars 72 are moving from right to left are the odd three bits of a character, 72-1, 72-3 and 72-5; those three bits are followed by the even three bits of the character, 72-2, 72-4 and 72-6. If the film is moving from left to right, then the three even bits occur first, followed by the three odd bits.

Since clock divider switch 164 (FIG. 4A) knows which direction the film is moving, it always transmits a properly timed clock 1 pulse (in the center of a data bar) to storage unit 110, which stores the three even binary bits of a character being sensed. Similarly, switch 164 transmits a properly timed clock 2 pulse to data storage unit 112 to store the three odd bits of that character.

The three even bits of a character are stored in flip-flops 110-0, 110-2 and 110-4 of data storage unit 110, and the three odd bits of that character and stored in flip-flops 112-1, 112-3 and 112-5 of the data storage unit 112.

At that point, the preprocessor 100 has a six bit character stored for transmission to the computer 300 (FIG. 5).

While the preprocessor 100 is reading the data bars 72 and sync bars 74 and processing them for storage in the data storage units 110 and 112, the computer 300 is doing related tasks, and has to be interrupted to take the data from the preprocessor 100. That interruption is signalled by an Interrupt signal which is generated every other clock signal by the one-shot multivibrator 166 (FIG. 4A). Multivibrator 166 acts on every other transition signal from the Q output of clock flip-flop 160. Multivibrator 166 transmits an Interrupt signal to the computer 300 to tell it that a full six bit character, sent via the data signal lines $D_0$, $D_2$ and $D_4$ (from storage unit 110) and $D_1$, $D_2$ and $D_3$ (from storage unit 112), are ready for storage in the computer 300.

COMPUTER 300 (FIG. 5)

When the computer 300 (FIG. 5) receives the Interrupt signal from the preprocessor 100 it stores the six bits of the character, $D_0$, $D_1$, $D_2$, $D_3$, $D_4$, $D_5$, into available frame register 300A.

Previously, an operator using keyboard 302 has entered the desired frame index code into the computer 300 which stores the first six bits (say "H") in the desired frame register 300D. Comparator 300C compares each character of the index code (say "HAMILTON") one at a time, on the fly. When the available register index code matches the desired index code, indicating that the desired frame has been located on the microfilm, a STOP signal is transmitted to film control and drive 306. At that point, the microfilm is moving too fast to stop in time for projection of the desired frame onto the viewing screen 18 of the microfilm reader 10, and it passes the optical projection unit 16 (FIG. 1). Computer 300 then reverses the direction of the microfilm and, at slow speed, moves the desired frame in front of the optical projection unit 16 for projection onto the viewing screen 18.

The computer 300 in the present embodiment is an Intel 8080/8085 and an exemplary program listing is attached as Appendix P. The program listing teaches how to program the Intel 8080/8085 to perform the necessary functions for frame selection, and is stored in an associated programmable read only memory. The comparison function of computer 300C is partially software programmed.

Standard transistor transistor logic (TTL) is used throughout the system, with 0–0.4 volts for a binary zero and 2.4–5 volts for a binary one. The photo diodes of the diode sensing units 60 are silicon photo diodes such as Vactec No. 21S468. The amplifier-triggers 1-13 and level select switches 106 of the left and right data signal units 102L and 102R are mounted on the left inside wall and right inside wall respectively of the viewing screen cabinet, adjacent to the associated diode sensing units 60.

APPENDIX P

```
FFFF =              TEST     EQU     NOT 0
                    ;        EQUATES              *
0040 =              CONST    EQU     40H
00A5 =              DSPM     EQU     0A5H                    ;DISPLAY MODE
0060 =              SIOD     EQU     40H OR 20H
0061 =              SIOC     EQU     SIOD+1
1000 =              BOMEM    EQU     4096
1400 =              EOMEM    EQU     BOMEM+1024
                             IF NOT TEST
                    IO0      EQU     00H
                             ENDIF
                             IF TEST
0040 =              IO0      EQU     40H
                             ENDIF
0048 =              IO1      EQU     IO0+8
0050 =              IO2      EQU     IO1+8
0058 =              IO3      EQU     IO2+8
0040 =              PIC      EQU     IO0
0050 =              SWTCH    EQU     IO2
0048 =              OPTICS   EQU     IO1
0058 =              CNTL     EQU     IO3
00A0 =              PIAA     EQU     80H OR 20H
00A1 =              PIAB     EQU     PIAA+1
00A2 =              PIAC     EQU     PIAB+1
00A3 =              PIACTL   EQU     PIAC+1
0000 =              INT0     EQU     0
0008 =              INT1     EQU     8*1
0010 =              INT2     EQU     8*2
0018 =              INT3     EQU     8*3
0020 =              INT4     EQU     8*4
0800 =              ICOM     EQU     INT0+2048
0803 =              COMM     EQU     ICOM+3
000D =              EXEC     EQU     0DH
0008 =              BS       EQU     08H
000A =              CAN      EQU     0AH
0001 =              FSR      EQU     01H
0013 =              BSR      EQU     13H
0000 =              STOP     EQU     0
0085 =              HSR      EQU     85H
0086 =              MSR      EQU     86H
0087 =              LSR      EQU     87H
0001 =              HSF      EQU     1H
0002 =              MSF      EQU     2
0003 =              LSF      EQU     3
0084 =              REV      EQU     84H
                    ;        STORAGE DEFINITIONS        *
1000                         ORG     BOMEM
1000                CTL      DS      1
1001                LRC      DS      1
1002                CNT      DS      1                       ;CHARACTER COUNT
1003                TIMR     DS      1
1004                KBUF     DS      2
1006                OPCOP    DS      2
1008                IBUF     DS      24
1020                CBUF     DS      33
                    ;
                    ; START HERE ON POWER UP
                             IF      NOT TEST
                             ORG     INT0
                             JMP     LOOP1               ;JUMP AROUND RST VECTORS
                    ;
                             ORG     INT1
                             JMP     INPS                ;
                    ;
```

```
                    ORG     INT2
            KBD:
                    JMP     CHAR
            ;
                    ORG     INT3
                    JMP     COMM                ;GOTO COMMUNICATIONS MODULE
            ;
                    ENDIF
                    IF TEST
0100                ORG 100H
                    ENDIF
            ;
            BEGIN:
0100 F3             DI
0101 AF             XRA     A                   ;
0102 D358           OUT     CNTL                ;CLEAR LATCH
0104 210810         LXI     H,IBUF
            LOOP1:
0107 3600           MVI     M,0
0109 23             INX     H
010A 7C             MOV     A,H
010B FE14           CPI     (EOMEM SHR 8 AND 0FFH)
010D C20701         JNZ     LOOP1
0110 F9             SPHL
            ; SET UP PCI
0111 DB50           IN      SWTCH               ;READ SWITCHES
0113 E603           ANI     00000011B           ;MASK LINE MODE
0115 FE01           CPI     1
0117 CC0008         CZ      ICOM                ;INITIALIZE COMMUNICATIONS
            ;
            ; SET UP PIA
011A 3EA6           MVI     A,10100110B         ;CONTROL WORD (MODE 1)
011C D3A3           OUT     PIACTL              ;WRITE TO CONTROL PORT
011E 3E05           MVI     A,05H               ;ALLOW INPUT INTERRUPTS
0120 D3A3           OUT     PIACTL              ;SET BIT
0122 3E0D           MVI     A,0DH               ;ALLOW OUTPUT INTERRUPTS
0124 D3A3           OUT     PIACTL              ;SET BIT
            ;
0126 210810         LXI     H,IBUF              ;SET UP INPUT BUFFER
0129 220410         SHLD    KBUF                ;STORE POINTER
012C 3EA5           MVI     A,DSPM
012E D3A0           OUT     PIAA
            ELOOP:
0130 CDD501         CALL    SETPIC
0133 DB50           IN      SWTCH               ;READ SWITCHES
0135 E603           ANI     00000011B           ;MASK  LINE/LOC/MAN
0137 FE03           CPI     00000011B           ;TEST  IF MANUAL
0139 CA0001         JZ      BEGIN               ;LOOP IF MANUAL
013C FB             EI                          ;ENABLE INTERRUPTS
013D 76             HLT                         ;WAIT FOR INTERRUPT
013E C33001         JMP     ELOOP               ;IDLE LOOP
            CHAR:
0141 F5             PUSH    PSW
0142 E5             PUSH    H
0143 DBA1           IN      PIAB
0145 B7             ORA     A
0146 C24B01         JNZ     NONUL
0149 3E5E           MVI     A,'^'               ;
            NONUL:
014B D3A0           OUT     PIAA                ;ECHO
014D FE20           CPI     ' '                 ;TEST CHARACTER VALUE
014F C25401         JNZ     $+5
0152 3E2F           MVI     A,'/'
0154 FE2F           CPI     '/'
0156 D27501         JNC     STORE               ;IF GT HEX 20
0159 FE0A           CPI     CAN                 ;TEST IF CANCEL
015B CC9C01         CZ      CANCEL              ;BRIF YES
015E FE08           CPI     BS                  ;BACKSPACE ?
0160 CC8F01         CZ      BACKSP              ;BRIF YES
0163 FE01           CPI     FSR                 ;FWD SPACE?
0165 CCD302         CZ      MOVF                ;BRIF YES
0168 FE13           CPI     BSR                 ;BACK SPACE FILE?
```

```
016A CCDE02           CZ      MOVR            ;BRIF YES, ELSE IGNORE
016D FE0D             CPI     EXEC            ;EXECUTE SEARCH?
016F CC0302           CZ      EXECS           ;BRIF YES
0172 E1               POP     H
0173 F1               POP     PSW
0174 C9               RET                     ; NOT A VALID CHARACTER
              STORE:
0175 FE5E             CPI     '^'
0177 C27C01           JNZ     $+5
017A 3E2E             MVI     A,'/'-1
017C 2A0410           LHLD    KBUF            ;GET POINTER
017F D62F             SUI     '/'             ;SUBTRACT 2FHEX
0181 77               MOV     M,A             ;STORE CHAR
0182 23               INX     H               ;INCREMENT POINTER
0183 7D               MOV     A,L             ;GET LSB (POINTER)
0184 FE20             CPI     (IBUF AND 0FFH)+24   ;TEST FOR END OF BUF
0186 CA8C01           JZ      $+6
0189 220410           SHLD    KBUF            ;ELSE, SAVE NEW POINTER
018C E1               POP     H
018D F1               POP     PSW             ;RESTORE
018E C9               RET                     ;RETURN
              BACKSP:
018F 2A0410           LHLD    KBUF
0192 2B               DCX     H               ;DECREMENT POINTER
0193 7D               MOV     A,L
0194 D607             SUI     (IBUF AND 0FFH)-1   ;TEST FOR UNDERFLOW
0196 C8               RZ                      ;RETURN IF AT BEGINNING
0197 220410           SHLD    KBUF            ;SAVE POINTER
019A AF               XRA     A
019B C9               RET
              CANCEL:
019C C30001           JMP     BEGIN
019F DB48    STOPF:    IN      OPTICS          ;READ STATUS FOR DARK
01A1 07               RLC                     ;TEST FOR DARK
01A2 DA9F01           JC      STOPF           ;LOOP IF NOT DARK
01A5 AF               XRA     A               ;GET ZEROO
01A6 C31003           JMP     SETL            ;SET LATCHES
              INPS:
01A9 F5               PUSH    PSW
01AA E5               PUSH    H
01AB 210210           LXI     H,CNT           ;GET FLAG
01AE B7               ORA     A
01AF CADA01           JZ      TSTFLG
01B2 FE20             CPI     32
01B4 CACD01           JZ      COUNT+2
01B7 2B               DCX     H
01B8 DB48             IN      OPTICS          ;GET CHAR
01BA E63F             ANI     3FH             ;MASK CHAR
01BC 02               STAX    B               ;SAVE IT
01BD AE               XRA     M
01BE 77               MOV     M,A
01BF 2B               DCX     H
01C0 7E               MOV     A,M
01C1 E604             ANI     00000100B       ;TEST DIR
01C3 C2CA01           JNZ     REVRSE          ;BRIF REVERSE
01C6 03               INX     B               ;BUMP POINTER
01C7 C3CB01           JMP     COUNT           ;TEST COUNT
01CA 0B      REVRSE:   DCX     B
              COUNT:
01CB 23               INX     H
01CC 23               INX     H
01CD 35               DCR     M               ;DECREMENT COUNT
              INPEX:
01CE CDD501           CALL    SETPIC          ;SET UP PIC
01D1 E1               POP     H
01D2 F1               POP     PSW             ;ELSE, RESTORE
01D3 FB               EI                      ;RESTORE INTERRUPTS
01D4 C9               RET
01D5 3E0F    SETPIC:   MVI     A,0FH           ;ALLOW ALL IINTERRUPTS
01D7 D340             OUT     PIC             ;
01D9 C9               RET
```

```
        TSTFLG:
01DA 2B          DCX    H
01DB 2B          DCX    H
01DC 3E40        MVI    A,40H        ;END OF BLOCK
01DE B6          ORA    M            ;SET FLAG
01DF 77          MOV    M,A
01E0 C3CE01      JMP    INPEX        ;GO AWAY
        SETFLG:
01E3 F3          DI
01E4 210010      LXI    H,CTL
01E7 3E9F        MVI    A,10011111B
01E9 A6          ANA    M
01EA 77          MOV    M,A
01EB E604        ANI    4
01ED C4FF01      CNZ    SER
01F0 CCFB01      CZ     SEF
01F3 23          INX    H
01F4 7E          MOV    A,M
01F5 363F        MVI    M,63
01F7 23          INX    H
01F8 3620        MVI    M,32
01FA C9          RET
01FB 012010 SEF: LXI    B,CBUF
01FE C9          RET
01FF 014110 SER: LXI    B,CBUF+33
0202 C9          RET
        EXECS:
0203 212C02      LXI    H,SEARCH
0206 E3          XTHL
0207 CDD302      CALL   MOVF         ;START FORWARD
020A CDF302      CALL   COMPARE      ;SEE WHICH WAY TO GO
020D 210010      LXI    H,CTL
0210 D22202      JNC    BACK         ;TOO FAR AHEAD
0213 3601        MVI    M,HSF
        GO:
0215 CDE301      CALL   SETFLG
0218 AF          XRA    A
0219 320610      STA    OPCOP
021C 3A0010      LDA    CTL
021F C31003      JMP    SETL
        BACK:
0222 E5          PUSH   H
0223 CDDE02      CALL   MOVR
0226 E1          POP    H
0227 3685        MVI    M,HSR        ;HI SPEED REVERSE
0229 C31502      JMP    GO
        SEARCH:
022C 3EE5        MVI    A,0E5H
022E D3A0        OUT    PIAA         ;SET BLOCK MODE
0230 CDE902      CALL   FIND
0233 EB          XCHG
0234 1E18        MVI    E,24
        SEARC1:
0236 DB48        IN     OPTICS
0238 07          RLC
0239 D26702      JNC    EOBLK
023C 3A0010      LDA    CTL
023F F5          PUSH   PSW
0240 CDD501      CALL   SETPIC
0243 FB          EI
0244 F1          POP    PSW
0245 07          RLC
0246 07          RLC
0247 DA6702      JC     EOBLK
024A B7          ORA    A
024B FA3602      JM     SEARC1
024E DBA2        IN     PIAC
0250 E608        ANI    00001000B
0252 CA3602      JZ     SEARC1
0255 CD3303      CALL   SENDD
0258 C23602      JNZ    SEARC1       ;CONTINUE
025B 210010      LXI    H,CTL
025E F3          DI
```

```
025F 7E                       MOV     A,M
0260 F620                     ORI     00100000B        ;SET DONE
0262 77                       MOV     M,A
0263 FB                       EI
0264 C32C02                   JMP     SEARCH
                    EOBLK:
0267 F3                       DI
0268 CDE301                   CALL    SETFLG
026B B7                       ORA     A                ;TEST LRC
026C C22C02                   JNZ     SEARCH           ;BAD LRC
026F CDF302                   CALL    COMPARE          ;
0272 F5                       PUSH    PSW              ;SAVE  RESULT
0273 CDCD02                   CALL    TSTDIR
0276 F2C202                   JP      FMOT
0279 F1                       POP     PSW              ;RESTORE RESULT
027A DA8402                   JC      TOGGLE           ;
027D AF                       XRA     A
027E 320610                   STA     OPCOP
0281 C32C02                   JMP     SEARCH
                    TOGGLE:
0284 210610                   LXI     H,OPCOP
0287 34                       INR     M
0288 7E                       MOV     A,M
0289 FE03                     CPI     3
028B C22C02                   JNZ     SEARCH
028E 210010                   LXI     H,CTL
0291 7E                       MOV     A,M
0292 F5                       PUSH    PSW
0293 AF                       XRA     A
0294 D358                     OUT     CNTL
0296 210080                   LXI     H,8000H
0299 23          DELAY:       INX     H
029A 7C                       MOV     A,H
029B B5                       ORA     L
029C C29902                   JNZ     DELAY
029F F1                       POP     PSW
02A0 FAB102                   JM      FWDM
                    REVM:
02A3 CDDE02                   CALL    MOVR
02A6 0A                       LDAX    B
02A7 B7                       ORA     A
02A8 C2A302                   JNZ     REVM
02AB CDF302                   CALL    COMPARE
02AE D2A302                   JNC     REVM
                    FWDM:
02B1 CDD302                   CALL    MOVF
02B4 0A                       LDAX    B
02B5 B7                       ORA     A
02B6 C2B102                   JNZ     FWDM
02B9 CDF302                   CALL    COMPARE
02BC DAB102                   JC      FWDM
02BF C30001                   JMP     BEGIN
                    FMOT:
02C2 F1                       POP     PSW              ;RESTORE
02C3 D28402                   JNC     TOGGLE
02C6 AF                       XRA     A
02C7 320610                   STA     OPCOP
02CA C32C02                   JMP     SEARCH
                    TSTDIR:
02CD 210010                   LXI     H,CTL            ;GET FLAG
02D0 7E                       MOV     A,M
02D1 B7                       ORA     A                ;SET FLAGS
02D2 C9                       RET
02D3 3E02       MOVF:          MVI     A,MSF            ;GET LOW SPEED FWD CMD
02D5 320010                   STA     CTL              ;SET CTL
02D8 CD1502                   CALL    GO
02DB C35103                   JMP     SERVO                   ;WAIT FOR MOTION
02DE 3E86       MOVR:          MVI     A,MSR            ;GET LOW SPEED REV
02E0 320010                   STA     CTL
02E3 CD1502                   CALL    GO
02E6 C35103                   JMP     SERVO                   ;WAIT FOR MOTION
```

```
             FIND:
02E9 112110           LXI     D,CBUF+1
02EC 1A      FIN1:    LDAX    D
02ED B7               ORA     A
02EE C0               RNZ
02EF 13               INX     D
02F0 C3EC02           JMP     FIN1
             COMPARE:
02F3 C5               PUSH    B
02F4 210810           LXI     H,IBUF
02F7 CDE902           CALL    FIND
02FA 0E18             MVI     C,24              ;SET COUNT
02FC CD0103           CALL    CLOOP
02FF C1               POP     B
0300 C9               RET                       ;KEEP GOING
0301 1A      CLOOP:   LDAX    D
0302 BE               CMP     M
0303 CA0903           JZ      NXT
0306 7E               MOV     A,M
0307 3C               INR     A
0308 C0               RNZ
             NXT:
0309 13               INX     D
030A 23               INX     H
030B 0D               DCR     C                 ;COUNT
030C C20103           JNZ     CLOOP
030F C9               RET                       ;RETURN
0310 D358     SETL:   OUT     CNTL              ;WRITE TO LATCH
0312 B7               ORA     A                 ;CHECK
0313 CA1903           JZ      $+6               ;SKIP IF ZERO
0316 320010           STA     CTL               ;SAVE COPY IN MEM
0319 CDD501           CALL    SETPIC
031C AF               XRA     A
031D FB               EI
031E C9               RET                       ;RETURN
             MESSAGE:
             ;                                  DATA IS IN MEMORY
031F 3EA5             MVI     A,DSPM
0321 D3A0             OUT     PIAA
0323 1E18             MVI     E,24
             MES1:
0325 DBA2             IN      PIAC              ;GET STATUS
0327 E608             ANI     00001000B         ;TEST INTREQ A
0329 CA2503           JZ      MES1              ;LOOP IF NOT
032C CD3303           CALL    SENDD
032F C22503           JNZ     MES1              ;LOOP FOR MORE
0332 C9               RET
             SENDD:
0333 7E               MOV     A,M
0334 B7               ORA     A
0335 C23A03           JNZ     NOSP
0338 3EF1             MVI     A,241
             NOSP:
033A C62F             ADI     '/'               ;
033C D3A0             OUT     PIAA              ;
033E 23               INX     H
033F 1D               DCR     E
0340 C9               RET
             SERVF:
0341 3A0010           LDA     CTL               ;GET DIR,SPEED
0344 E6FE             ANI     0FEH              ;MASK OFF L.S.
0346 C31003           JMP     SETL
             SERVS:
0349 3A0010           LDA     CTL               ;GET DIR,SPEED
034C F603             ORI     3                 ;SET LOW SPEED
034E C31003           JMP     SETL
             SERVO:
0351 CD8303           CALL    RDST
0354 DA5D03           JC      SERVO             ;BRIF NOT DARK
0357 CD4103           CALL    SERVF             ;SPEED UP
035A C35103           JMP     SERVO             ;LOOP
```

```
                SERVO:
035D CD9503             CALL    SPDCK
                SERV1:
0360 CD8303             CALL    RDST        ;READ STATUS
0363 D2A303             JNC     CKCNT       ;BRIF DARK
0366 B7                 ORA     A           ;TEST CLOCK
0367 F27003             JP      SERV2       ;NEXT PHASE
036A CD8C03             CALL    UPTIM       ;UPDATE TIMER
036D C36003             JMP     SERV1       ;LOOP
                SERV2:
0370 CD9503             CALL    SPDCK       ;CHECK SPEED
                SERVA:
0373 CD8303             CALL    RDST        ;READ STATUS
0376 D2A303             JNC     CKCNT       ;BRIF DARK
0379 B7                 ORA     A           ;TEST CLOCK
037A FA5D03             JM      SERVO       ;NEXT PHASE
037D CD8C03             CALL    UPTIM       ;UPDATE TIMER
0380 C37303             JMP     SERVA       ;LOOP
                RDST:
0383 3A0010             LDA     CTL
0386 D358               OUT     CNTL
0388 DB48               IN      OPTICS
038A 07                 RLC
038B C9                 RET
                UPTIM:
038C 210310             LXI     H,TIMR
038F 34                 INR     M
0390 C0                 RNZ
0391 35                 DCR     M
0392 C34103             JMP     SERVF
                SPDCK:
0395 210310             LXI     H,TIMR
0398 7E                 MOV     A,M
0399 3600               MVI     M,0
039B FE40               CPI     CONST
039D D24103             JNC     SERVF
03A0 C34903             JMP     SERVS
                CKCNT:
03A3 210210             LXI     H,CNT
03A6 7E                 MOV     A,M
03A7 B7                 ORA     A
03A8 F5                 PUSH    PSW
03A9 CDE301             CALL    SETFLG      ;SET UP FOR NEXT BLOCK
03AC 02                 STAX    B
03AD F1                 POP     PSW
03AE C25103             JNZ     SERVO
03B1 CD9F01             CALL    STOPF
03B4 CDE902             CALL    FIND
03B7 EB                 XCHG
03B8 C31F03             JMP     MESSAGE

A>
```

What is claimed is:

1. An automatic high speed microfilm searching system for locating a desired frame of microfilm employing a microfilm reader which rapidly transports the microfilm by means of a film drive and control unit from one spool to another past an optical projection unit which projects the optically-recorded images from the microfilm onto a viewing screen, each frame consisting of information data and index data, the index data comprising a sequence of vertically-aligned data bar groups, each vertical data group repesenting all or part of a character of a sequence of characters of a unique index code for the associated frame, with a synchronization bar vertically positioned near said vertical data groups, said system comprising:

(a) a bar sensing unit comprising a plurality of vertically-aligned data bar sensors and a plurality of synchronization bar sensors vertically-aligned with said data bar sensors, with at least two data bar sensors adapted to sense each of the data bars of a vertical group and at least two synchronization bar sensors adapted to sense the synchronization bar;

(b) said bar sensing unit being fixedly positioned within the field of focus of the optically-projected images of the data bars and synchronization bar;

(c) one or more of the plurality of synchronization bar sensors sensing the synchronization bar, depending on whether the synchronization bar is high, low or centrally positioned vertically;

(d) position determining means responsive to each of the plurality of synchronization bar sensors to determine whether the sensed synchronization bar is high, low or centrally positioned vertically;

(e) data bar signal selecting means responsive to each of the plurality of data bar sensors and to said position determining means to select the data bar signals from the data bar sensors corresponding in vertical position to the synchronization bar sensor which sensed the synchronization bar;

(f) computer means responsive to selected data bar signals representing a plurality of characters of the index code and to signals repesenting the desired frame index code to cause said film drive and control unit to stop said desired frame adjacent the optical projection unit to project the information on said desired frame onto said viewing screen; and (g) a plurality of pairs of synchronization bars, each half the width of a data bar, with each pair positioned vertically adjacent a vertical data group, and further including storage means responsive to the transition between each pair of synchronization bars to store the data represented by the associated vertical data group.

2. an automatic high speed microfilm searching system for locating a desired frame of microfilm employing a microfilm reader which rapidly transports the microfilm by means of a film drive and control unit from one spool to another past an optical projection unit which projects the optically-recorded images from the microfilm onto a viewing screen, each frame consisting of information data and index data, the index data comprising a sequence of vertically-aligned data bar groups, each vertical data group representing all or part of a character of a sequence of characters of a unique index code for the associated frame, with a synchronization bar vertically positioned near said vertical data groups, said system comprising:

(a) a bar sensing unit comprising a plurality of vertically-aligned data bar sensors and a plurality of synchronization bar sensors vertically-aligned with said data bar sensors, with at least two data bar sensors adapted to sense each of the data bars of a vertical group and at least two synchronization bar sensors adapted to sense the synchronization bar;

(b) said bar sensing unit being fixedly positioned within the field of focus of the optically projected images of the data bars and synchronization bars;

(c) one or more of the plurality of synchronization bar sensors sensing the synchronization bar, depending on whether the synchronization bar is high, low or centrally positioned vertically;

(d) position determining means responsive to each of the plurality of synchronization bar sensors to determine whether the sensed synchronization bar is high, low or centrally positioned vertically;

(e) data bar signal selecting means, responsive to each of the plurality of data bar sensors and to said position determining means to select the data bar signals from the data bar sensors corresponding in vertical position to the synchronization bar sensor which sensed the synchronization bar;

(f) data storage means for storing said selected data bar signals; and (g) a plurality of pairs of synchronization bars, each half the width of a data bar, with each pair positioned vertically adjacent a vertical data group, with said data storage means being responsive to the transition between each pair of synchronization bars to store the data represented by the associated vertical data group.

3. The automatic high speed microfilm searching system of claim 1 or claim 2 wherein said plurality of synchronization bar sensors of said bar sensing unit comprises three synchronization bar sensors whereby (a) if said three synchronization bar sensors each sense the synchronization bar, said position determining means determines that the data bars are centrally positioned, (b) if only the top one or two synchronization bar sensors sense the synchronization bar, said position determining means determines that the data bars are high, and (c) if only the lower one or two synchronization bar sensors sense the synchronization bar, said position determination means determines that the data bars are low.

4. The automatic high speed microfilm searching system of claim 1 including data storage means for storing the data representing two sequential half-characters prior to transmission to said computer means.

5. The automatic high speed microfilm searching system of claim 1 or claim 2 whereby said bar sensing unit is mounted immediately adjacent one side of said viewing screen and a second bar sensing unit is mounted immediately adjacent the other side of said viewing screen so that said index bar data can be sensed coming on to said viewing screen when the microfilm is moved in either direction.

6. The automatic high speed searching system of claim 5 wherein each index character consists of a first group of bits and an adjacent second group of bits, said system further including first storage means for storing the first group of bits and second storage means for storing the second group of bits, and direction control means responsive to a direction signal from said computer means to load said first group of bits of a character into said first stroage means and said second group of bits of a character into said second storage means irrespective of whether the first or second group of bits are sensed first by one of said bar sensing units.

7. The automatic high speed microfilm searching system of claim 5 wherein each index character consists of a half character of odd bits and an adjacent half character of even bits, said system further including odd bit storage means for storing the odd bits and even bit storage means for storing the even bits, and direction control means responsive to a direction signal from said computer means to load said odd bits of a character into said odd bit storage means and said even bits of a character into said even bit storage means irrespective of whether the odd or even bits are sensed first by one of said bar sensing units.

8. An automatic high speed microfilm searching system according to claim 2 wherein said synchronization bar which is sensed by said plurality of synchronization bar sensors is separate from the data bars but adjacent to and horizontally aligned with the synchronization bar pairs vertically aligned with the data bars, said position determining means being responsive to said separate synchronization bar to determine whether it is high, low or centrally positioned vertically.

9. An automatic high speed microfilm searching system according to claim 8 wherein said bar sensing unit includes at least one gap sensor responsive to the absence of synchronization bars to determine when the microfilm images projected onto said bar sensing unit are between frames of information data.

10. An automatic high speed microfilm searching according to claim 9 wherein said gap sensor is vertically aligned with said synchronization bar sensors but is wide enough to bridge at least two synchronization bars.

11. An automatic high speed microfilm searching system according to claim 9 wherein said bar sensing unit includes two gap sensors, vertically aligned with and above and below said synchronization bar sensors and wide enough to bridge at least two synchronization bars.

* * * * *